United States Patent
Tachiwa et al.

(10) Patent No.: US 9,258,475 B2
(45) Date of Patent: Feb. 9, 2016

(54) WIRELESS IMAGING SYSTEM, METHOD OF CONTROLLING WIRELESS IMAGING SYSTEM, WIRELESS COMMUNICATION APPARATUS, AND STORAGE MEDIUM

(71) Applicant: CANON KABUSHIKI KAISHA, Tokyo (JP)

(72) Inventors: Wataru Tachiwa, Yokohama (JP); Tetsuo Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 14/288,626

(22) Filed: May 28, 2014

(65) Prior Publication Data
US 2014/0362245 A1 Dec. 11, 2014

(30) Foreign Application Priority Data
Jun. 6, 2013 (JP) ................................. 2013-120106

(51) Int. Cl.
*H04N 5/232* (2006.01)
(52) U.S. Cl.
CPC ................................. *H04N 5/23206* (2013.01)
(58) Field of Classification Search
CPC .............. H04N 5/23206; H04N 5/232; H04N 2101/00; H04N 1/00307; H04N 5/23203; H04N 21/4223
USPC ...................................................... 348/211.2
See application file for complete search history.

(56) References Cited

U.S. PATENT DOCUMENTS

| | | | |
|---|---|---|---|
| 8,195,040 B2* | 6/2012 | Shirakawa | G03B 15/05 396/56 |
| 8,768,158 B2* | 7/2014 | Hanayama | G03B 15/05 396/155 |
| 2009/0185797 A1 | 7/2009 | Ogasawara | 396/59 |

FOREIGN PATENT DOCUMENTS

JP 2008-102337 A 5/2008

* cited by examiner

*Primary Examiner* — Tuan Ho
*Assistant Examiner* — Selam Gebriel
(74) *Attorney, Agent, or Firm* — Fitzpatrick, Cella, Harper & Scinto

(57) ABSTRACT

A wireless apparatus includes a determination unit configured to determine whether the received control information is leading control information for controlling the imaging process or succeeding control information succeeding the leading control information, a decision unit configured to decide a succeeding control timing at which the succeeding control information is output, with reference to a leading control timing at which the leading control information is output, and an output unit configured to output the leading control information to the imaging unit in accordance with the leading control timing and output the succeeding control information to the imaging unit in accordance with the succeeding control timing.

13 Claims, 11 Drawing Sheets

FIG. 8A FIG. 8B

WIRELESS IMAGING SYSTEM, METHOD OF CONTROLLING WIRELESS IMAGING SYSTEM, WIRELESS COMMUNICATION APPARATUS, AND STORAGE MEDIUM

BACKGROUND OF THE INVENTION

1. Field of the Invention

The present invention relates to a wireless imaging system which performs imaging control operations such as an exposure start operation and an exposure end operation by wireless communication, a wireless communication apparatus included in the wireless imaging system, a method of controlling the wireless imaging system, and a storage medium.

2. Description of the Related Art

Recently, in the industrial equipment field, there has been developed an advanced device which selects and holds one of randomly stacked components or automatically detects an abnormality by processing an image captured by a camera.

A camera is sometimes attached to the distal end of a robot arm to perform imaging near a processing target. However, there is a risk that a cable will deteriorate and break by repeated deformation. Therefore, there are increasing needs for a technique of performing this operation by wireless communication.

Camera Link is a standard for cabling and interfacing for imaging control and image acquisition with respect to industrial cameras. In this case, imaging control means consecutive control operations required for imaging, for example, an exposure start operation, the light emission start operation of an electronic flash device, a light emission end operation, and an exposure end operation. On the other hand, Japanese Patent Laid-Open No. 2008-102337 discloses a technique for controlling an external electronic flash device from a camera by wireless communication.

When transmitting imaging control information by wireless communication, there are three challenges to be overcome.

The first challenge is to maintain the time intervals between the respective control operations. In general, when performing wireless communication, the delay time in communication changes each time because of MAC (Media Access Control) processing for avoiding wireless communication collision with other peripheral devices and retransmission control for the occurrence of a communication failure. On the other hand, imaging control requires very high accuracy concerning the time intervals between the respective control operations. If, for example, the time from the start of exposure to the end of exposure or the time from the start of light emission of imaging illumination to the end of light emission changes even slightly, overexposure or underexposure will occur. Likewise, a camera using a rolling shutter requires high accuracy concerning the time interval from the start of exposure to the start of light emission.

The second challenge is to reduce a delay time. For example, a robot designed to hold a component uses a captured image for feedback control. In such industrial equipment, if the start of imaging is delayed, the acquisition of an image is delayed. This increases the cycle time for operations. For this reason, for example, it is sometimes impossible to make the wireless transmission side transmit imaging control information altogether after the end of the imaging control upon recording the information together with time stamps and to make the wireless reception side reproduce the imaging control from the start.

The third challenge is to effectively use a wireless band. The technique disclosed in patent literature 1 is designed to secure a band by performing MAC processing in advance before the start of imaging and then occupy the band by the required time. This method can suppress fluctuations in delay time caused by MAC processing. However, if a plurality of industrial devices are placed near to each other, the time during which a peripheral device cannot perform wireless communication prolongs, resulting in an increase in cycle time.

The present invention provides a wireless communication technique of, when transmitting a plurality of pieces of consecutive control information by wireless communication with varying delay times, maintaining the time intervals between the respective control operations with a minimum delay and occupied band.

SUMMARY OF THE INVENTION

According to one aspect of the present invention, there is provided a wireless imaging system comprising: a control unit configured to output a plurality of pieces of control information for controlling an imaging process; a transmission unit configured to wirelessly transmit a packet containing the control information; a receiving unit configured to receive the packet and output the control information contained in the packet; and an imaging unit configured to perform an imaging process based on the control information output from the receiving unit, the receiving unit including a determination unit configured to determine whether the received control information is leading control information for controlling the imaging process or succeeding control information succeeding the leading control information, a decision unit configured to decide a succeeding control timing at which the succeeding control information is output, with reference to a leading control timing at which the leading control information is output, and an output unit configured to output the leading control information to the imaging unit in accordance with the leading control timing and output the succeeding control information to the imaging unit in accordance with the succeeding control timing.

According to another aspect of the present invention, there is provided a wireless communication apparatus which receives a packet containing control information for controlling an imaging process by an imaging unit via wireless communication and outputs the control information contained in the packet, the apparatus comprising: a determination unit configured to determine whether the received control information is leading control information for controlling the imaging process or succeeding control information succeeding the leading control information; a decision unit configured to decide a succeeding control timing at which the succeeding control information is output, with reference to a leading control timing at which the leading control information is output; and an output unit configured to output the leading control information to the imaging unit in accordance with the leading control timing and output the succeeding control information to the imaging unit in accordance with the succeeding control timing.

According to the present invention, when transmitting a plurality of pieces of consecutive control information by wireless communication with varying delay times, it is possible to maintain the time intervals between the respective control operations with a minimum delay and occupied band.

Further features of the present invention will become apparent from the following description of exemplary embodiments (with reference to the attached drawings).

DESCRIPTION OF THE EMBODIMENTS

Embodiments of the present invention will be exemplarily described in detail below with reference to the accompanying drawings. Note that the constituent elements described in the embodiments are merely examples. The technical scope of the present invention is determined by the scope of claims and is not limited by the following individual embodiments.

First Embodiment

Figure 1:
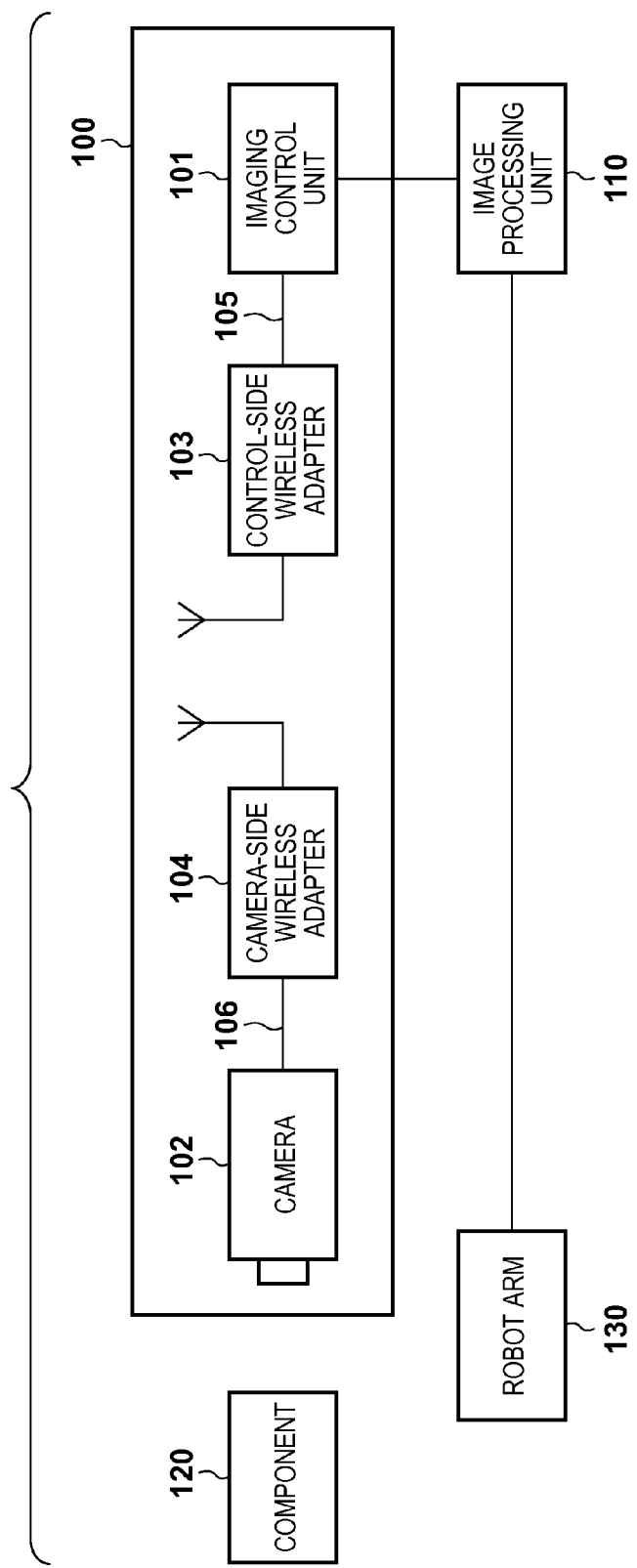
FIG. 1 is a block diagram showing the system configuration of the first embodiment.

FIG. 1 is a block diagram showing the arrangement of a wireless imaging system according to the first embodiment of the present invention. An image processing unit 110 processes an image obtained by imaging a component 120 by using a wireless imaging system 100. A robot arm 130 is controlled based on the image processed by the image processing unit 110 and holds the component 120.

The wireless imaging system 100 includes an imaging control unit 101, a camera 102, a control-side wireless adapter 103, a camera-side wireless adapter 104, and cables 105 and 106. The control-side wireless adapter 103 (wireless transmission unit) wirelessly transmits a wireless packet containing control information. The camera-side wireless adapter 104 (wireless receiving unit) receives the wireless packet and outputs the control information contained in the wireless packet to the camera 102.

Upon receiving an imaging instruction from the image processing unit 110, the imaging control unit 101 outputs four instructions including an exposure start instruction, a light emission start instruction, a light emission end instruction, and an exposure end instruction, as imaging control information, to the cable 105 at predetermined time intervals. These time intervals may be stored as fixed values for reference in the imaging control unit 101 or may be decided based on an instruction from the image processing unit 110.

The imaging control information output to the cable 105 is relayed (transmitted) from the control-side wireless adapter 103 to the camera-side wireless adapter 104. The information is then output via the cable 106 and reaches the camera 102. The cables 105 and 106 are those based on the Camera Link standard. According to Camera Link, it is possible to independently transmit four binary logic signals for imaging control. The binary logic signals will be referred to as CC1 to CC4. The imaging control unit 101 includes an interface based on the Camera Link standard and uses CC1 as an exposure control signal. When issuing an exposure start instruction, the imaging control unit 101 changes the logic value of CC1 from 0 to 1. When issuing an exposure end instruction, the imaging control unit 101 changes the logic value of CC1 from 1 to 0.

The imaging control unit 101 uses CC2 as a light emission control signal. The imaging control unit 101 changes the logic value of CC2 from 0 to 1 to issue a light emission start instruction, and changes the logic value CC2 from 1 to 0 to issue a light emission end instruction in the same manner as described above. That is, the imaging control unit 101 outputs imaging control information by changing the logic values of these two signals.

The camera 102 includes an interface based on the Camera Link standard. The camera 102 recognizes CC1 and CC2 as an exposure control signal and a light emission control signal, respectively, and recognizes leading and trailing edges of each signal as the start and end of a corresponding operation, respectively.

Figure 2:
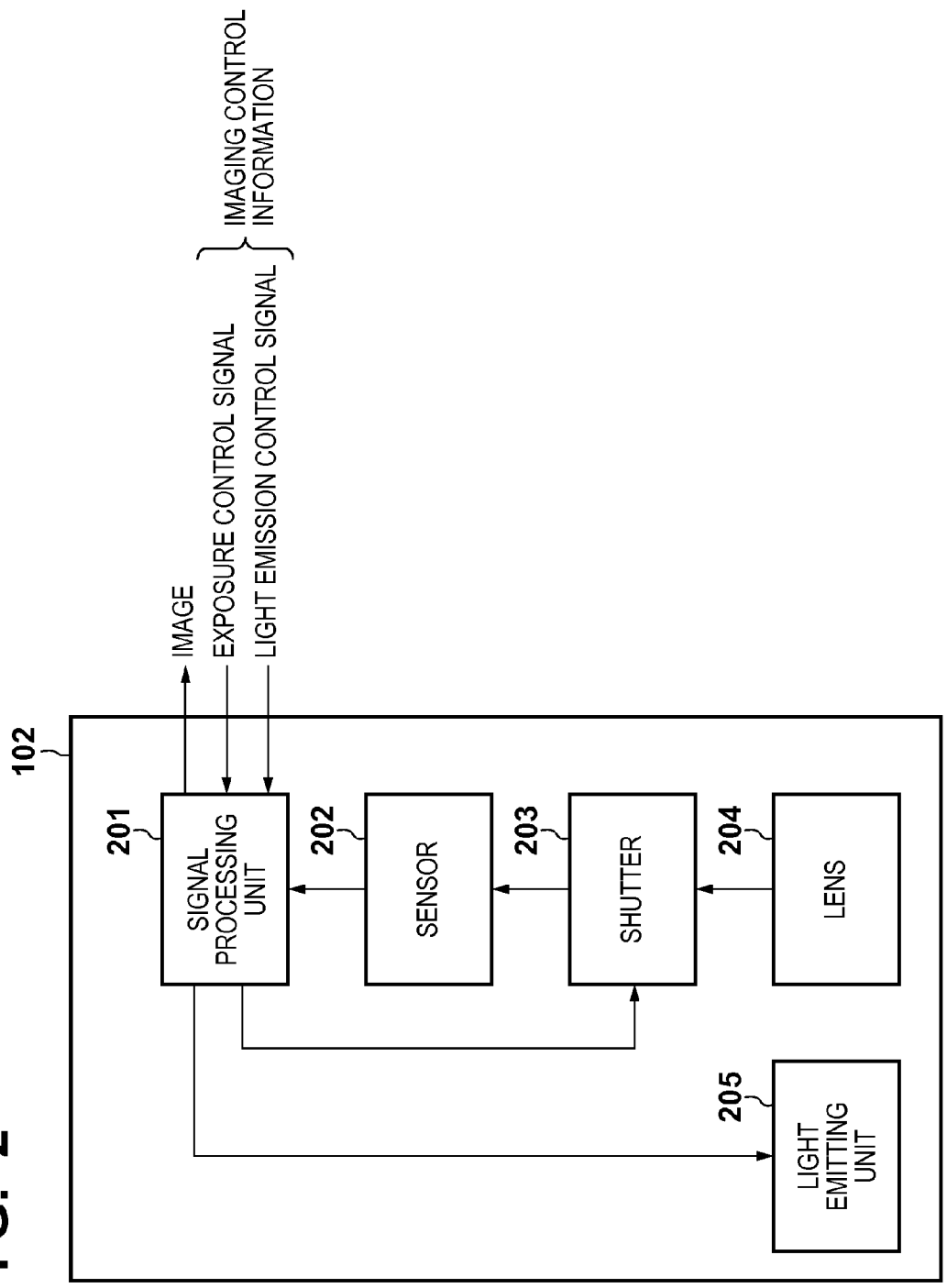
FIG. 2 is a block diagram showing the arrangement of a camera.

FIG. 2 shows the arrangement of the camera 102. A signal processing unit 201 performs control to make light passing through a lens 204 strike a sensor 202 by opening a shutter 203 only for the period from the instant an exposure start instruction is input to the instant an exposure end instruction is input based on an exposure control signal. Likewise, the signal processing unit 201 turns on a light emitting unit 205 to emit light only for the period from the instant a light emission start instruction is input to the instant a light emission end instruction is input based on a light emission control signal.

In addition, the signal processing unit 201 acquires each pixel value of the sensor 202 after the end of exposure, and generates one frame of image information. The signal processing unit 201 then outputs the information to the cable 106 in accordance with the Camera Link standard. According to Camera Link, a signal line for image transmission is prepared independently of the binary logic signals CC1 to CC4 for imaging control. The camera-side wireless adapter 104 receives the image output from the camera 102 to the cable 106. The camera-side wireless adapter 104 converts the input image into a wireless packet and transmits it to the control-side wireless adapter 103. The control-side wireless adapter 103 outputs the received wireless packet to the cable 105. The imaging control unit 101 converts the wireless packet input from the cable 105 into data in a predetermined format and outputs the data to the image processing unit 110.

Figure 3:
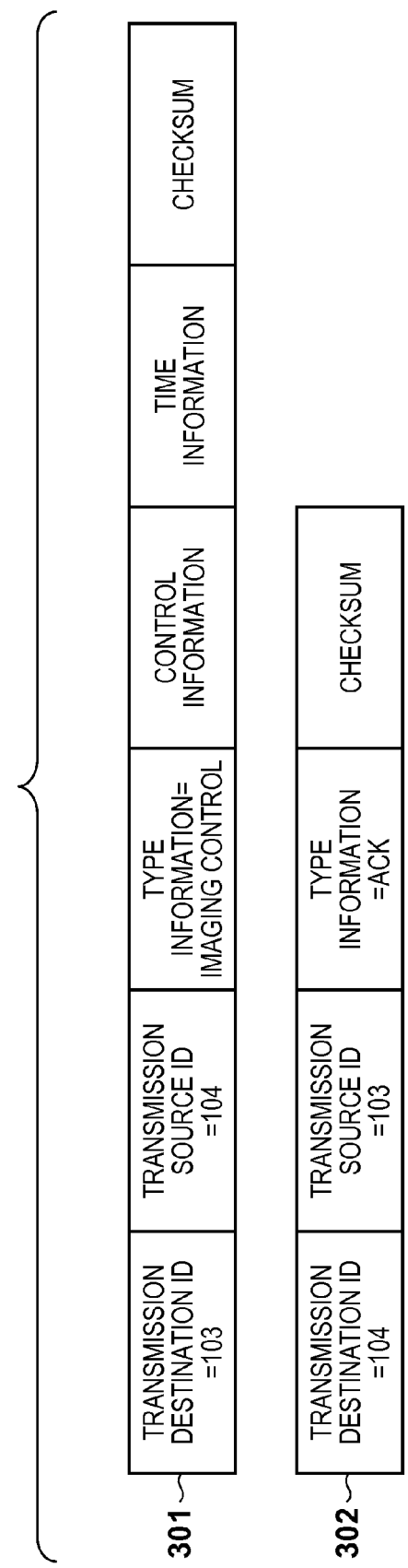
FIG. 3 is a view showing the arrangement of a wireless packet.

The contents of wireless communication in a case in which the control-side wireless adapter 103 transmits imaging control information to the camera-side wireless adapter 104 will be described below with reference to FIG. 3.

The control-side wireless adapter 103 includes an interface based on the Camera Link standard, and monitors the logic values of the exposure control signal and light emission control signal input from the imaging control unit 101 via the cable 105. Every time detecting a change in the logic value of either of the signals, the control-side wireless adapter 103 generates and transmits a wireless packet 301 in FIG. 3. The wireless packet 301 includes six fields, namely a transmission destination ID field, a transmission source ID field, a type information field, a control information field, a time information field, and a checksum field. Pieces of identification information (ID) unique to the transmission destination and transmission source of this wireless packet are set in the transmission destination ID field and the transmission source ID field, respectively. If the control-side wireless adapter 103 has "103" as identification information (ID) and the camera-side wireless adapter 104 has "104" as identification information (ID), the control information input unit of the control-side wireless adapter 103 respectively sets "104" and "103" in the transmission destination ID field and the transmission source ID field. A unique value representing that this wireless packet is a packet for transmitting imaging control information is set in the type information field.

Figure 4:
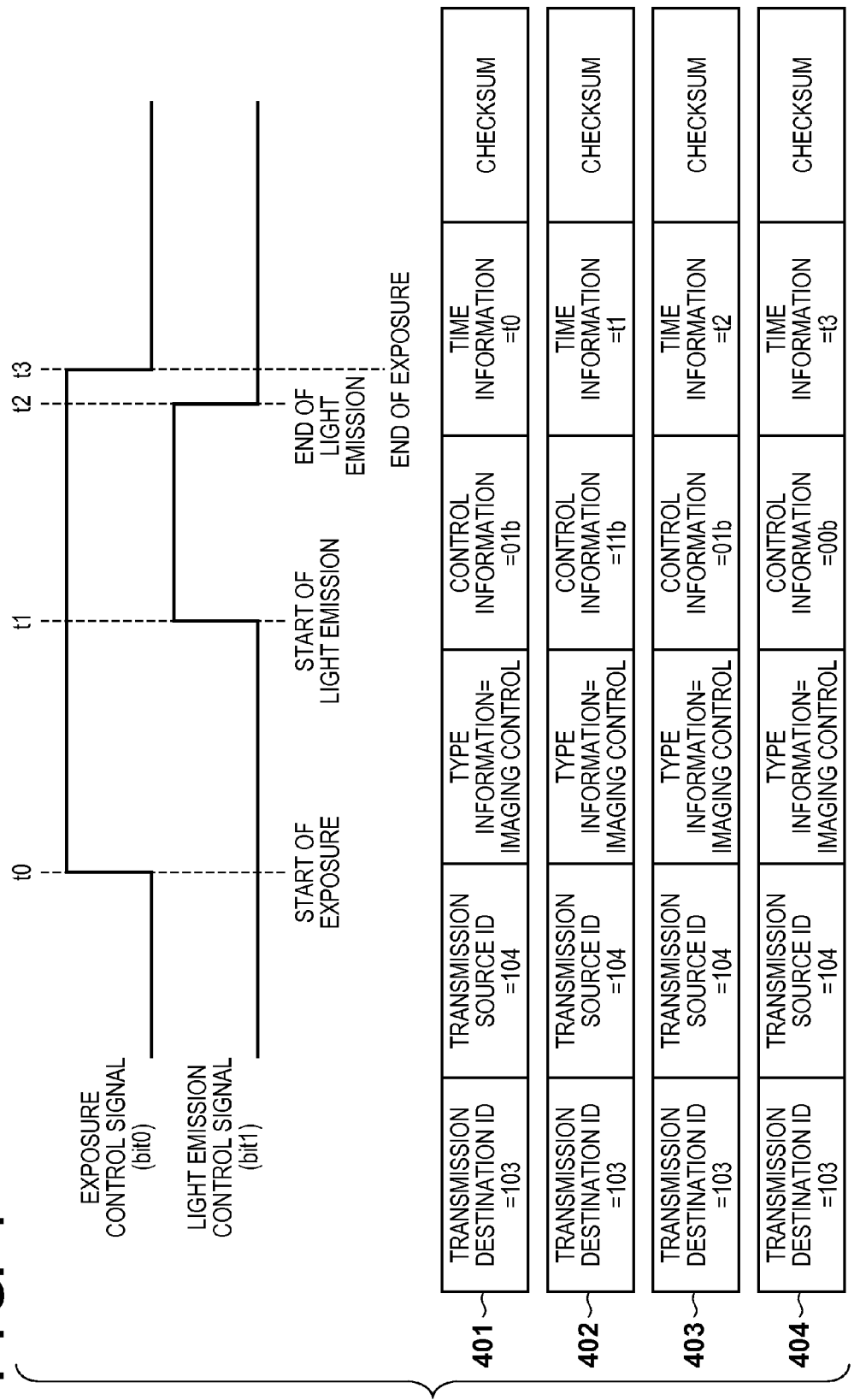
FIG. 4 is a view for explaining the operation of a control-side wireless adapter.

In the control information field, a 2-bit value is set, which is obtained by encoding the logic value of the exposure control signal into bit 0, and the logic value of the light emission control signal into bit 1. If, for example, the control-side wireless adapter 103 detects that the logic value of the light emission control signal remains 0 and the logic value of the exposure control signal has risen from 0 to 1, the control information input unit generates a wireless packet 401 with the value in the control information field being 01b (FIG. 4). Note that in this embodiment, a 2-bit value with bit 1=X and bit 0=Y is written as XYb.

The control-side wireless adapter 103 sets, in the time information field, the value of the time when the control-side wireless adapter 103 has detected the imaging control information output from the imaging control unit 101. The value of this time is the value of a free run timer in the control-side wireless adapter 103.

The control-side wireless adapter 103 sets, in the checksum field, the sum total of the values in the fields other than the checksum field of the wireless packet 301.

FIG. 4 is a view for explaining the operation of the control-side wireless adapter 103. Assume that as shown in FIG. 4, the control-side wireless adapter 103 has detected the start of exposure, the start of light emission, the end of light emission, and the end of exposure as imaging control information at times t0, t1, t2, and t3. In this case, the control-side wireless adapter 103 generates and transmits the wireless packet 401 immediately after detecting the start of exposure. The control-side wireless adapter 103 sets, as control information of the generated wireless packet 401, 01b indicating that the logic value of the light emission control signal remains 0 and the logic value of the exposure control signal has risen from 0 to 1 (the start of exposure).

Likewise, the control-side wireless adapter 103 transmits a wireless packet 402 immediately after detecting the start of light emission, a wireless packet 403 immediately after detecting the end of light emission, and a wireless packet 404 immediately after detecting the end of exposure. In this case, the control-side wireless adapter 103 sets, as control information of the wireless packet 402 in the control information field, 11b indicating that the logic value of the light emission control signal has risen from 0 to 1 (the start of light emission) and the logic value of the exposure control signal indicates the state of the start of exposure (logic value=1). The control-side wireless adapter 103 sets, as control information of the wireless packet 403 in the control information field, 01b indicating that the logic value of the light emission control signal has fallen from 1 to 0 (the end of light emission) and the logic value of the exposure control signal indicates the state of the start of exposure (logic value=1). The control-side wireless adapter 103 sets, as control information of the wireless packet 404 in the control information field, 00b indicating that the logic value of the light emission control signal indicates the end of light emission (logic value=0) and the logic value of the exposure control signal indicates the end of exposure (logic value=0).

The control-side wireless adapter 103 repeatedly retransmits the same wireless packet at predetermined time intervals until receiving an ACK packet from the camera-side wireless adapter 104. The wireless packet 301 in FIG. 3 exemplifies the arrangement of an ACK packet. The camera-side wireless adapter 104 checks the transmission destination ID of the received wireless packet. Assume that the ID matches the self station ID. In this case, if the checksum is correct upon further checking, the camera-side wireless adapter 104 returns an ACK packet. The control-side wireless adapter 103 receives the wireless packet 301 from the camera-side wireless adapter 104. If the transmission destination ID matches the self station ID and the checksum is correct, the control-side wireless adapter 103 determines that an ACK packet has been received, and does not subsequently retransmit the same wireless packet 301.

In addition, the camera-side wireless adapter 104 includes an interface based on the Camera Link standard. Upon properly receiving the wireless packet 301 addressed to the self station, the camera-side wireless adapter 104 changes the logic value settings of the exposure control signal and light emission control signal to be output to the cable 106 in accordance with the imaging control information. This transmits the imaging control information to the camera 102. At this time, the camera-side wireless adapter 104 performs timing control by referring to the time information contained in the wireless packet 301. This operation will be described later.

Figure 5:
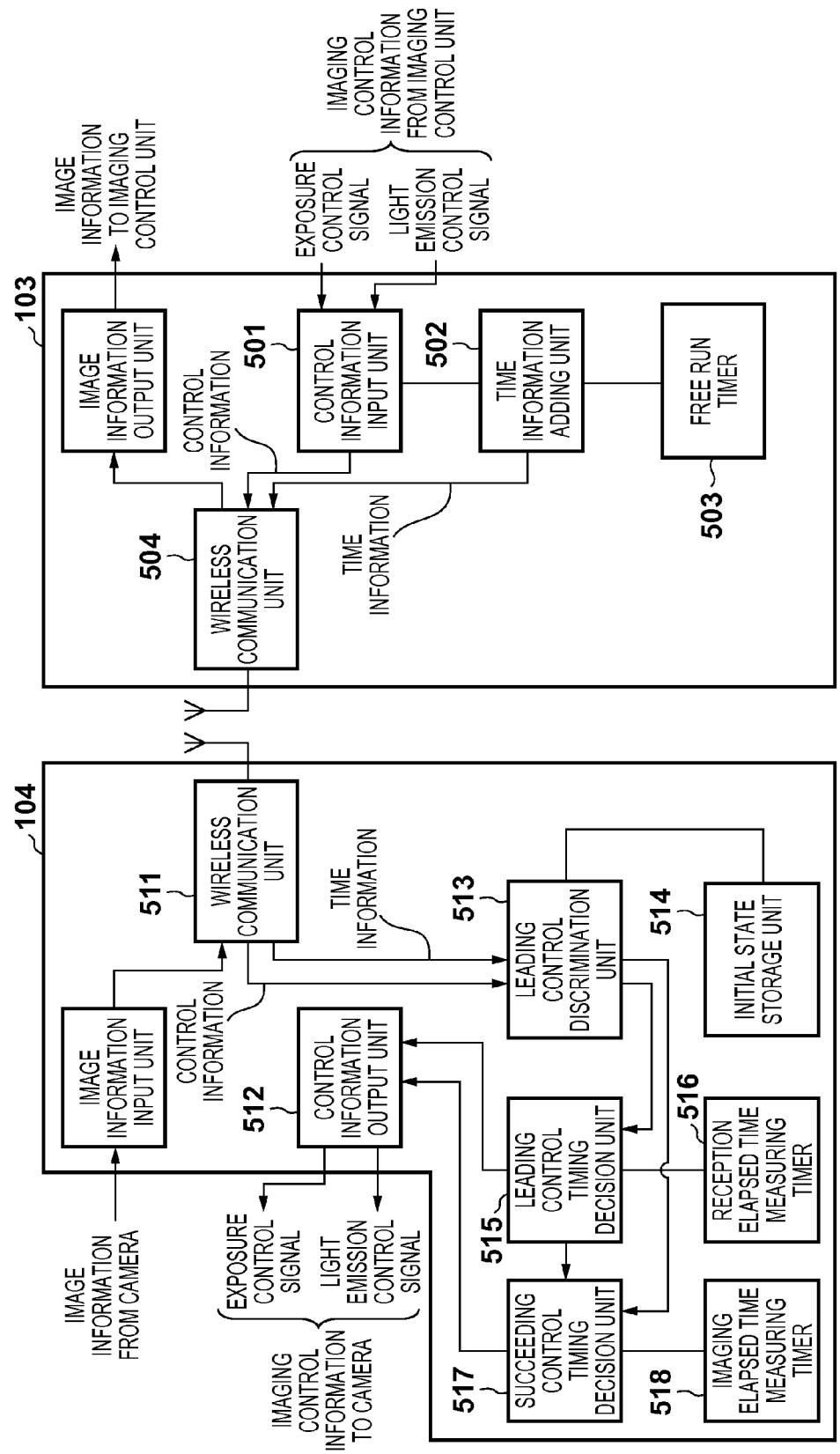
FIG. 5 is a block diagram showing the arrangements of the control-side wireless adapter and a camera-side wireless adapter.

The arrangements of the control-side wireless adapter 103 and camera-side wireless adapter 104 will be described next with reference to FIG. 5. Note that the respective blocks in FIG. 5 indicate the arrangement of functional blocks. Each block is implemented by a standard circuit, an IC, a program, a volatile memory, a nonvolatile memory, a timer, a bus, and the like.

A control information input unit 501 of the control-side wireless adapter 103 monitors a change in the logic value of either the exposure control signal or the light emission control signal input from the imaging control unit 101. Upon detecting a change in logic value, the control information input unit 501 encodes the value after the change into a 2-bit value described above, and outputs it as control information to a wireless communication unit 504.

A time information adding unit 502 notifies the wireless communication unit 504 of the value to be set in the time information field of the wireless packet 301, that is, the time (time information) when the control information input unit 501 has detected the change. The time information adding unit 502 acquires this time by referring to the value of a free run timer 503. The free run timer 503 is a timer (time measuring unit) which always counts up at a predetermined period after the power supply of the control-side wireless adapter 103 is turned on.

Control information and time information are input in pair with each other to the wireless communication unit 504.

The wireless communication unit 504 generates and transmits the wireless packet 301 based on inputs from the control information input unit 501 and the time information adding unit 502. The wireless communication unit 504 repeatedly retransmits the same wireless packet at predetermined time intervals until receiving an ACK packet 302.

Upon properly receiving the wireless packet 301 addressed to the self station, a wireless communication unit 511 of the camera-side wireless adapter 104 performs the processing of returning the ACK packet 302 to the control-side wireless adapter 103. Note that the wireless communication unit 504 and the wireless communication unit 511 have standard modulation/demodulation processing functions, and wirelessly transmit wireless packets by using the functions. Upon properly receiving the wireless packet 301 addressed to the self station, the wireless communication unit 511 outputs the pair of control information and time information contained in the wireless packet 301 to a leading control discrimination unit 513.

Figure 6:
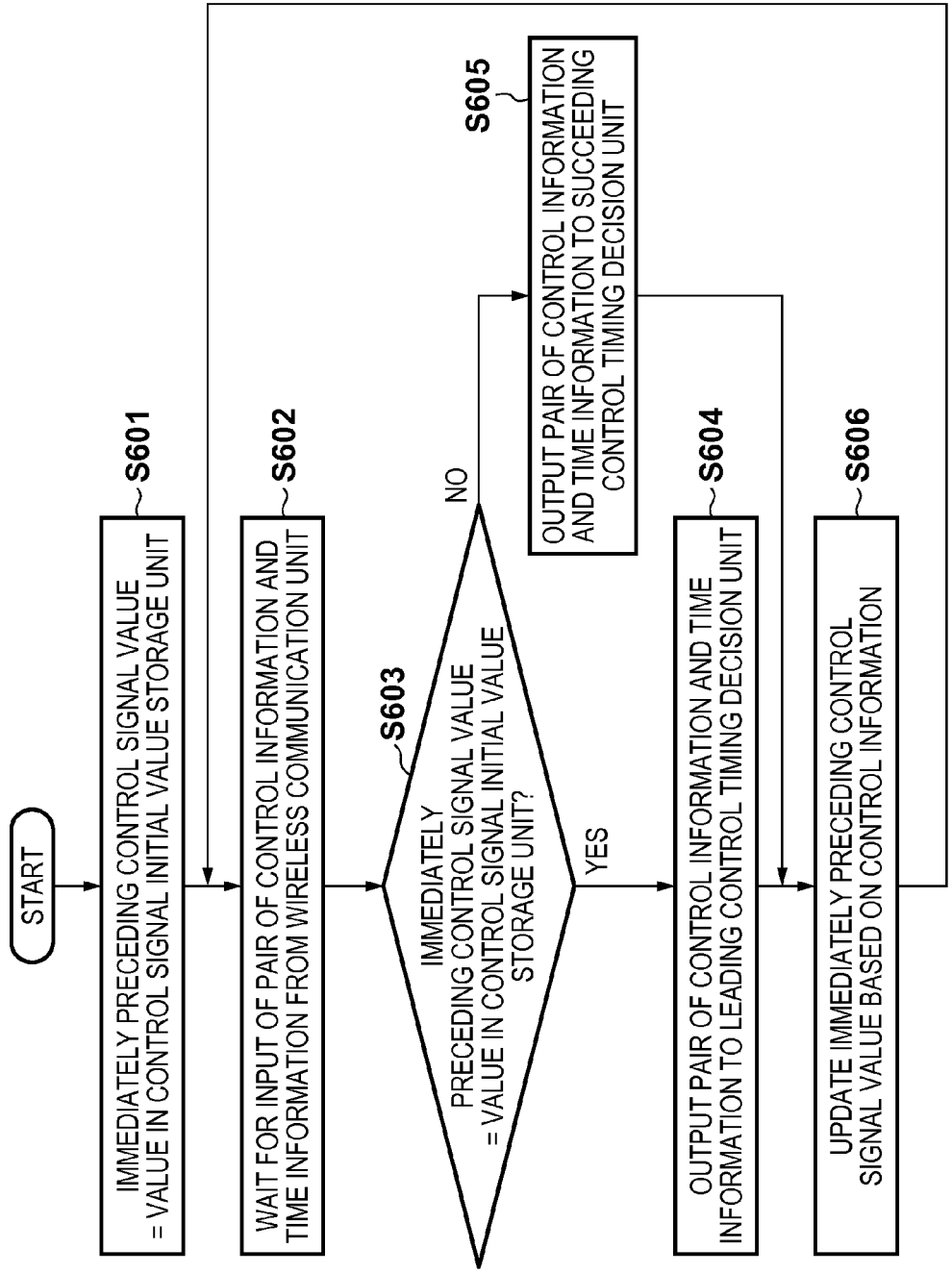
FIG. 6 is a flowchart for processing in a leading control discrimination unit.

The leading control discrimination unit 513 outputs the pair of control information and time information input from the wireless communication unit 511 to a leading control timing decision unit 515 if the control information represents leading control on imaging control, and to succeeding control timing decision unit 517 otherwise. This discrimination processing will be described with reference to FIG. 6.

First of all, the leading control discrimination unit 513 initializes the value of the immediately preceding control signal stored as a variable by using the value held by an initial state storage unit 514 (step S601). In this case, the initial state storage unit 514 stores in advance the logic value of an exposure control signal and the logic value of a light emission control signal in a period during which no imaging process is performed. In this embodiment, since each control signal represents a start by a change from logic value 0 to logic value 1, both the logic values are 0 in a period during which no imaging process is performed. The initial state storage unit 514 holds value 00b obtained by encoding this into a 2-bit value.

The leading control discrimination unit 513 waits for the input of a pair of control information and time information from the wireless communication unit 511 (step S602). The leading control discrimination unit 513 determines whether the immediately preceding control signal value held as a variable matches the value in the initial state storage unit 514 (step S603). If they match, the leading control discrimination unit 513 outputs the pair of control information and time information acquired in step S602 to the leading control timing decision unit 515 (step S604). Upon determining in step S603 that the two values do not match, the leading control discrimination unit 513 outputs the pair of control information and time information acquired in step S602 to the succeeding control timing decision unit 517 (step S605).

In either of steps S604 and S605, the leading control discrimination unit 513 updates the immediately preceding control signal value held as a variable based on the acquired control information in step S602, and the process returns to step S602 (step S606).

The following will exemplify the processing by the leading control discrimination unit 513 to be performed upon receiving control information from the wireless communication unit 511, after the power supply is turned on, in the order of the start of exposure, the start of light emission, the end of light emission, and the end of exposure. Assume for the following description that the start of exposure, the start of light emission, the end of light emission, and the end of exposure are encoded into binary control signals, namely 01b, 11b, 01b, and 00b, respectively, as shown in FIG. 4.

The leading control discrimination unit 513 processes the first control information representing the start of exposure in steps S601, S602, S603, and S604 in the order named, and outputs the resultant information to the leading control timing decision unit 515. Thereafter, in step S606, the leading control discrimination unit 513 updates the immediately preceding control signal value to 01b. The leading control discrimination unit 513 next processes control information (11b) representing the start of light emission in steps S602, S603, and S605 in the order named, and outputs the resultant information to the succeeding control timing decision unit 517. Thereafter, in step S606, the leading control discrimination unit 513 updates the immediately preceding signal value (01b) into 11b. After the leading control discrimination unit 513 also outputs control information (01b) representing the end of light emission and control information (00b) representing the end of exposure to the succeeding control timing decision unit 517, the immediately preceding control signal value returns to 00b again in step S606. In determination in step S603 when imaging control starts again, since the immediately preceding control signal value (00b) matches the initial value (00b) stored in the initial state storage unit 514 (YES in step S603), the leading control discrimination unit 513 executes processing in step S604. That is, the leading control discrimination unit 513 outputs a pair of a control signal and time information received next to the leading control timing decision unit 515 (step S604).

In the above manner, the leading control discrimination unit 513 outputs only a pair of leading control information and time information for imaging control to the leading control timing decision unit 515, and outputs a pair of succeeding control information and time information to the succeeding control timing decision unit 517. Note that in a system designed to always start imaging control from the start of exposure, the leading control discrimination unit 513 may determine whether the control information obtained from the wireless communication unit 511 is the leading information by determining whether the control information represents the start of exposure.

Figure 7:
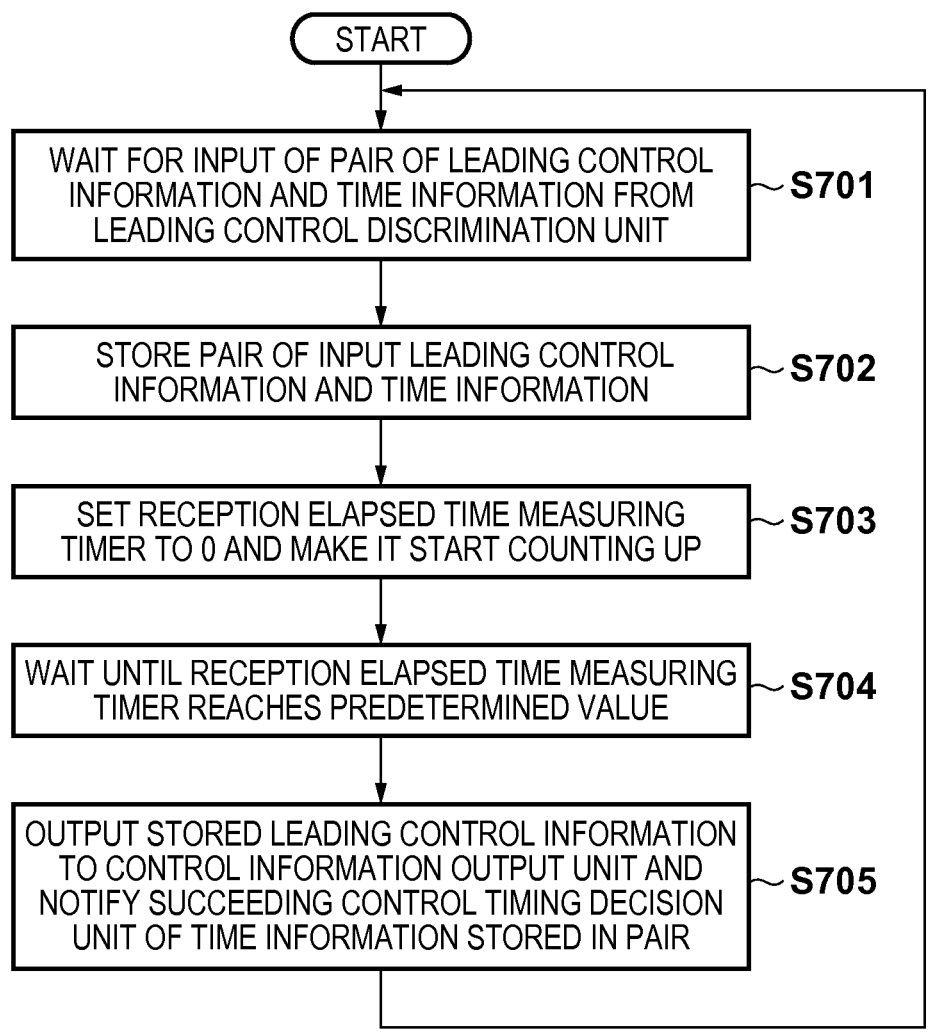
FIG. 7 is a flowchart for processing in a leading control timing decision unit.

Referring back to FIG. 5, the leading control timing decision unit 515 obtains the leading control information from the wireless communication unit 511 and outputs the control information to a control information output unit 512 after the lapse of a predetermined time. Processing by the leading control timing decision unit 515 will be described in detail with reference to FIG. 7.

Upon obtaining a pair of leading control information and time information from the leading control discrimination unit 513 (step S701), the leading control timing decision unit 515 stores the pair in the storage unit (step S702), and causes a reception elapsed time measuring timer 516 to start counting up upon setting the timer to 0 (step S703). Thereafter, the leading control timing decision unit 515 waits until the value of the reception elapsed time measuring timer 516 reaches a predetermined value (step S704), and outputs the control information stored in the storage unit to the control information output unit 512. When outputting control information to the control information output unit 512, the leading control timing decision unit 515 outputs the time information stored in pair with the control information to the succeeding control timing decision unit 517 (step S705). Since this time information is time information concerning the leading control operation in imaging control, the time information is t0 in the case of FIG. 4. The leading control timing decision unit 515 repeats the above processing. Note that a predetermined value used for comparison in step S704 may be held as a fixed value in the leading control timing decision unit 515 in advance. Alternatively, the value may be contained in a wireless packet and set by the imaging control unit 101 or the control-side wireless adapter 103.

Figure 8:
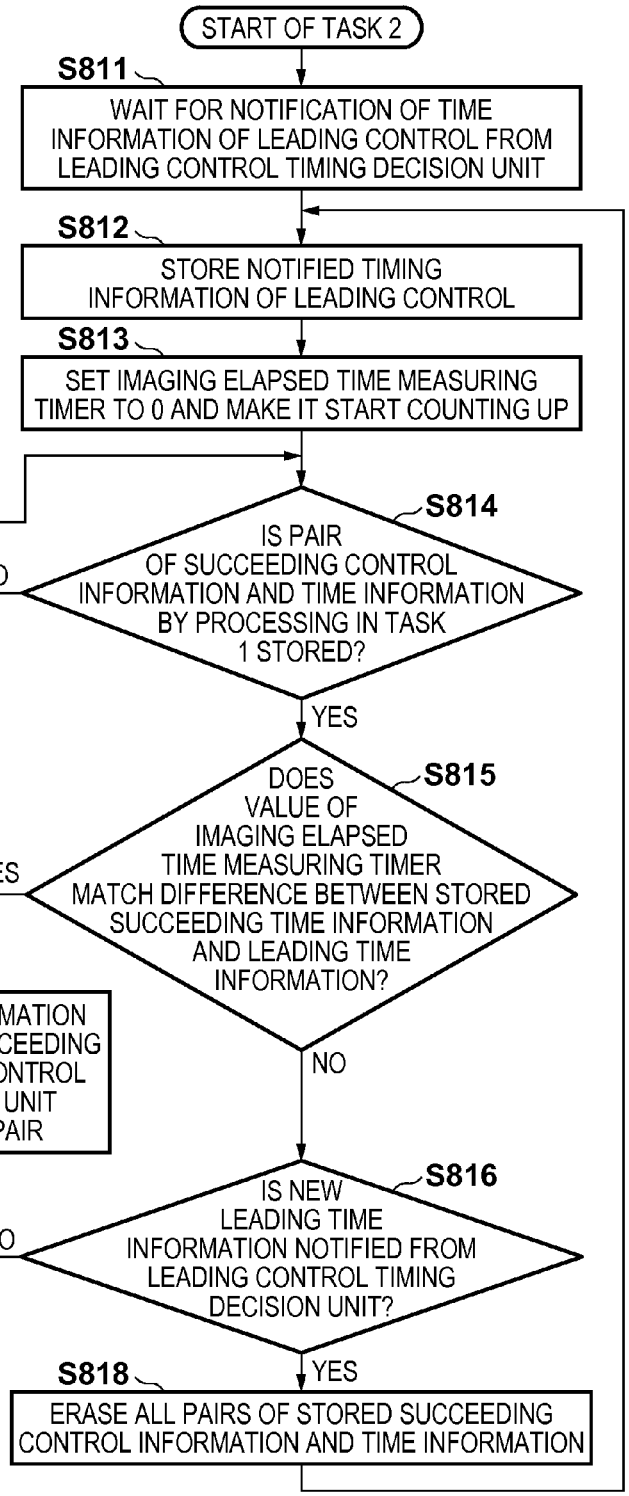
FIGS. 8A and 8B are flowcharts for processing in a succeeding control timing decision unit.

An outline of processing by the succeeding control timing decision unit 517 will be described next by exemplifying the time information set in the wireless packets 401 to 404 in FIG. 4. The succeeding control timing decision unit 517 outputs control information representing the start of light emission to the control information output unit 512 after the lapse of t1−t0 since the leading control timing decision unit 515 outputs control information representing the start of exposure to the control information output unit 512. Likewise, the succeeding control timing decision unit 517 respectively outputs pieces of control information representing the end of light emission and the end of exposure to the control information output unit 512 after the lapses of t2−t0 and t3−t0 since the leading control timing decision unit 515 outputs control information representing the start of exposure to the control information output unit 512. FIGS. 8A and 8B are flowcharts for explaining a processing procedure in the succeeding control timing decision unit 517.

The succeeding control timing decision unit 517 concurrently executes task 1 in FIG. 8A and task 2 in FIG. 8B. As processing corresponding to task 1, the succeeding control timing decision unit 517 obtains a pair of succeeding control information and time information from the leading control discrimination unit 513 (step S801), and stores the pair in the storage unit (step S802). The storage unit may store a plurality of pairs of succeeding control information and time information.

In addition, as processing corresponding to task 2, the succeeding control timing decision unit 517 waits for the notification of the time information of leading control from the leading control timing decision unit 515. Upon receiving the notification of the leading time information (step S811), the succeeding control timing decision unit 517 stores the information as the time information of leading control (step S812). The succeeding control timing decision unit 517 sets an imaging elapsed time measuring timer 518 to 0 and makes it start counting up (step S813).

Subsequently, the succeeding control timing decision unit 517 waits for the input of a pair of succeeding control information and time information by processing in task 1 (step S814). Assume that in this case, time information of leading control is represented by t0, and time information of succeeding control stored in the storage unit is represented by t1. In this case, if the value of the imaging elapsed time measuring timer 518 matches the time difference of t1-t0 (YES in step S815), the succeeding control timing decision unit 517 outputs the control information paired with time information t1 to the control information output unit 512. The succeeding control timing decision unit 517 then erases the pair of the output control information and time information t1 from the storage unit (step S817).

Subsequently, the process returns to step S814 to wait until another pair of succeeding control information and time information is stored in the storage unit by task 1. If another pair of succeeding control information and time information is input and stored in the storage unit by processing in task 1, and the value of the imaging elapsed time measuring timer 518 matches t2−t0 (time difference) (step S815), the succeeding control timing decision unit 517 outputs control information paired with time information t2 to the control information output unit 512. If the value of the imaging elapsed time measuring timer 518 matches t3−t0 (time difference) (step S815), the succeeding control timing decision unit 517 outputs control information paired with time information t3 to the control information output unit 512. If the value of the imaging elapsed time measuring timer 518 matches t4-t0 (time difference) (step S815), the succeeding control timing decision unit 517 outputs control information paired with time information t4 to the control information output unit 512.

Note, however, that if the leading control timing decision unit 515 notifies the succeeding control timing decision unit 517 of new leading time information (NO in step S815 and YES in step S816), the process returns to step S812 upon erasing all the succeeding control information and time information stored in the storage unit (step S818).

The control information output unit 512 receives control information from the leading control timing decision unit 515 and the succeeding control timing decision unit 517. The control information output unit 512 then decodes the received control information into an exposure control signal and a light emission control signal, and outputs them as control signals to the camera.

The effects of this embodiment of the present invention will be described next with reference to FIG. 9. A timing chart 901 indicates, in chronological order, how an exposure control signal and light emission control signal input from the imaging control unit 101 to the control-side wireless adapter 103 change. First of all, the control-side wireless adapter 103 detects changes 911 to 914 in control signal at times t0 to t3. These pieces of control information are transmitted as wireless packets to the camera-side wireless adapter 104 with different delay times.

Arrows 921 to 924 indicate how wireless packets are transmitted in correspondence with the changes 911 to 914 in control signal. The different slopes of the arrows indicate different delays in wireless communication. For example, the arrow 921 indicates that Ta represents the delay time from the instant the imaging control unit 101 inputs a control signal indicating the start of exposure to the control-side wireless adapter 103 to the instant the wireless communication unit 511 of the camera-side wireless adapter 104 outputs information indicating the control signal to the leading control timing decision unit 515. When a peripheral wireless communication environment changes, the number of times of retransmission control described above increases/decreases. For this reason, this delay time changes each time. Such changes in delay time generally occur in wireless communication.

A timing chart 903 indicates processing in the leading control timing decision unit 515 in chronological order. The leading control timing decision unit 515 receives the control information indicated by the arrow 921 from the leading control discrimination unit 513 at time t0+Ta, and outputs the information to the control information output unit 512 after the lapse of a predetermined time Tw (a predetermined value of the reception elapsed time measuring timer) by the processing described with reference to FIG. 7. The time Tw is a time (reference time) as a reference for the decision of the output timing of leading control information.

A timing chart 905 indicates, in chronological order, how an exposure control signal and light emission control signal input from the camera-side wireless adapter 104 to the camera 102 change. An arrow 931 indicates the occurrence of a change 951 in control signal to the camera 102 by processing by the leading control timing decision unit 515.

A timing chart 904 indicates processing in the succeeding control timing decision unit 517 in chronological order. The succeeding control timing decision unit 517 outputs pieces of control information indicated by the arrows 922 to 924 to the control information output unit 512 at the timings corresponding to t1−t0, t2−t0, and t3−t0 with reference to the time at which leading control is output from the leading control timing decision unit 515. Arrows 942 to 944 indicate the occurrence of changes 952 to 954 in control signal to the camera 102 by processing by the succeeding control timing decision unit 517.

Figure 9:
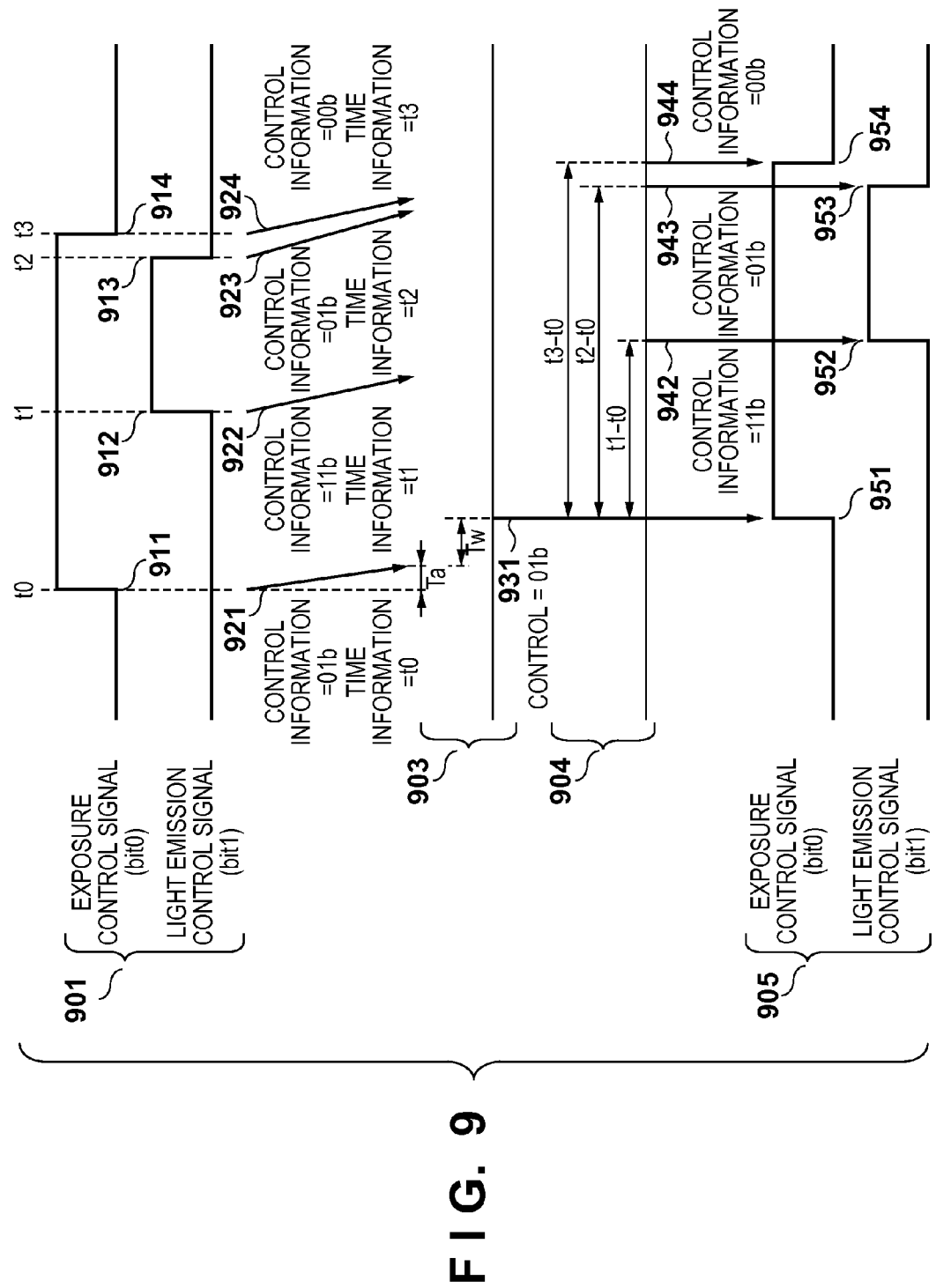
FIG. 9 is a chart for explaining the effects of the present invention.

In this case, the time interval from the change 951 to the change 952 in control signal output to the camera 102 corresponds to t1−t0, as shown in FIG. 9. This time interval matches the time interval (t1−t0) from the change 911 to the change 912 output from the imaging control unit 101. Likewise, the time intervals from the change 951 to the change 953 and the change 954 in control signal output to the camera 102 respectively match the time intervals from the change 911 to the change 913 and the change 914 output from the imaging control unit 101.

Even when a plurality of pieces of consecutive imaging control information transmitted by wireless communication in which a delay time changes each time, it is possible to maintain the time intervals between the respective control operations. In addition, since a wireless packet is transmitted only when control information changes, the band is not occupied. Furthermore, before the imaging control unit 101 completely outputs a plurality of pieces of consecutive imaging control information, the pieces of imaging control information are sequentially input to the camera 102 starting from the leading information. This also suppresses a delay until the camera 102 outputs image information.

Note that, obviously, the above embodiment is associated with one aspect of the present invention, and the present invention can be applied to other embodiments. For example, in this embodiment, the imaging control unit 101 outputs pieces of imaging control information in the order of the start of exposure, the start of light emission, the end of light emission, and the end of exposure. However, the present invention can be applied to a case in which this order changes. In addition, the number of pieces of imaging control information may not be four, and imaging control information may include information other than those associated with exposure and light emission. Furthermore, this embodiment uses CC1 and CC2 based on the Camera Link standard to transmit imaging control information. However, it is possible to use other signals and a standard other than the Camera Link standard.

Second Embodiment

Figure 10:
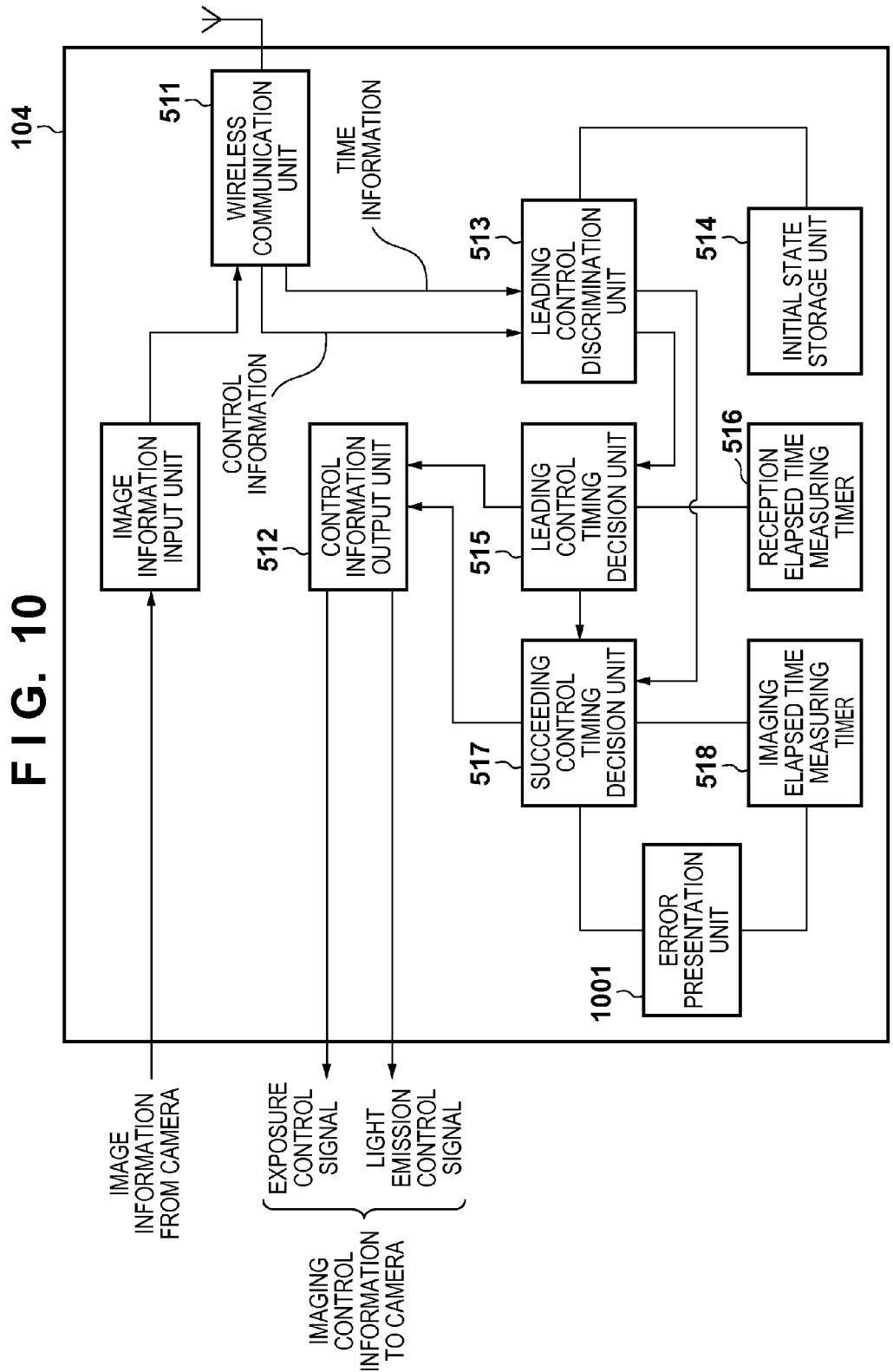
FIG. 10 is a block diagram showing the arrangement of a camera-side wireless adapter according to the second embodiment.

The second embodiment of the present invention will be described with reference to FIGS. 10 and 11. FIG. 10 shows the arrangement of a camera-side wireless adapter 104 in the second embodiment of the present invention. The camera-side wireless adapter 104 differs from that in the first embodiment in that it includes an error presentation unit 1001. Only differences from the first embodiment will be described below.

Figure 11:
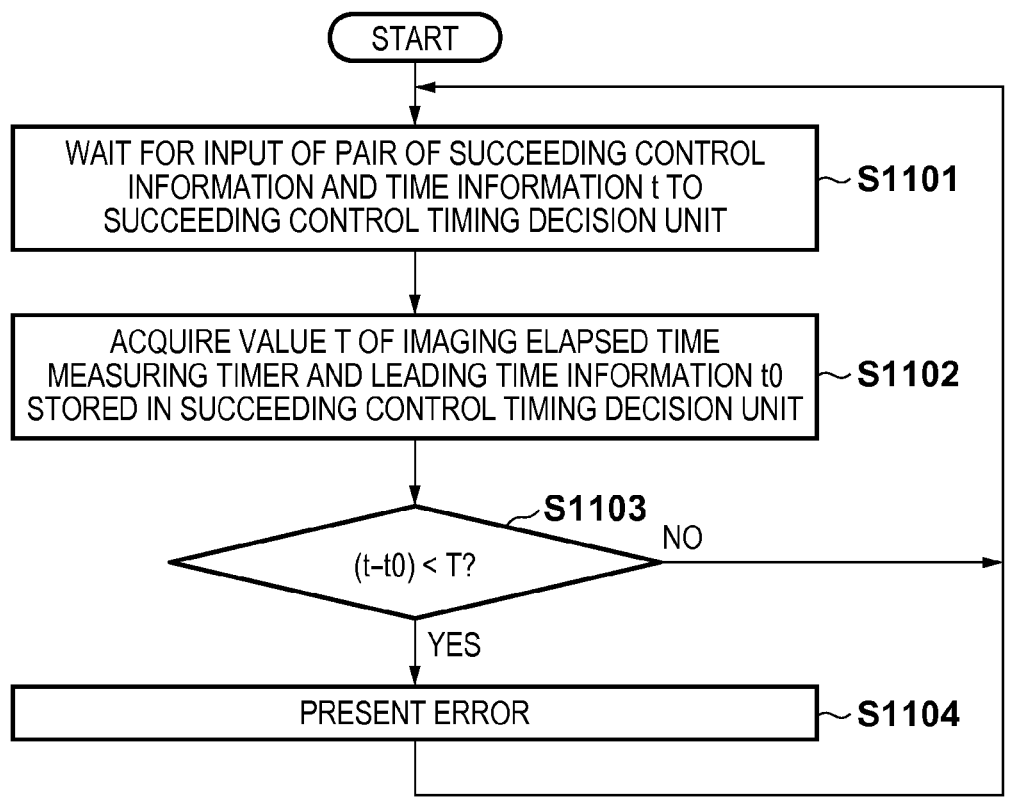
FIG. 11 is a flowchart for processing in an error presentation unit.

FIG. 11 is a flowchart of processing in the error presentation unit 1001. The error presentation unit 1001 waits for the input of a pair of succeeding control information and time information t from a leading control discrimination unit 513 to a succeeding control timing decision unit 517 (step S1101). Subsequently, the error presentation unit 1001 acquires a value T of an imaging elapsed time measuring timer 518 which measures the elapsed time from the start of imaging (t0) at this time and time information t0 of leading control stored by the succeeding control timing decision unit 517 (step S1102). In step S1103, the error presentation unit 1001 compares the output timing (t–t0) of succeeding control information and the value T of the measured elapsed time. If (t–t0)≥T (NO in step S1103), the error presentation unit 1001 returns the process to step S1101 without presenting any error. In contrast to this, if (t–t0)<T (YES in step S1103), the error presentation unit 1001 determines that the timing at which the succeeding control information should be output to the camera has already passed by the time the pair of information is input to the succeeding control timing decision unit 517. At this time, the error presentation unit 1001 presents an error (step S1104). The error presentation unit 1001 can present an error by using an arbitrary presentation method. For example, the error presentation unit 1001 may turn on an LED to present the occurrence of an error to the user or may display an error message on the display unit to notify the user of the occurrence of an error. It is also possible to provide a transmission path for notifying an imaging control unit 101 of an error and perform notification by using the transmission path.

This makes it possible to detect, by using the error presentation unit, the occurrence of a delay when the notification of succeeding control information and time information from the wireless communication unit 511 to the succeeding control timing decision unit 517 has greatly delayed. If, therefore, a peripheral wireless communication environment changes to increase a wireless communication delay to result in failing to perform proper imaging control, it is possible to avoid the use of the corresponding image for image processing.

As has been described above, according to each embodiment of the present invention, it is possible to maintain the time intervals between the respective control operations even when transmitting a plurality of pieces of consecutive imaging control information by wireless communication in which a delay time changes each time.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-120106, filed Jun. 6, 2013, which is hereby incorporated by reference herein in its entirety.

What is claimed is:

1. A wireless imaging system comprising:
   a control unit configured to output a plurality of pieces of control information for controlling an imaging process;
   a transmission unit configured to wirelessly transmit a packet containing the control information;
   a receiving unit configured to receive the packet and output the control information contained in the packet; and
   an imaging unit configured to perform an imaging process based on the control information output from said receiving unit,
   said receiving unit including a determination unit configured to determine whether the received control information is leading control information for controlling the imaging process or succeeding control information succeeding the leading control information,
a decision unit configured to decide a succeeding control timing at which the succeeding control information is output, with reference to a leading control timing at which the leading control information is output, and
an output unit configured to output the leading control information to said imaging unit in accordance with the leading control timing and output the succeeding control information to said imaging unit in accordance with the succeeding control timing.

2. The system according to claim 1, wherein said control unit outputs one piece of leading control information and not less than one piece of succeeding control information succeeding the leading control information as the plurality of pieces of control information.

3. The system according to claim 1, wherein said receiving unit further comprises a storage unit configured to store control information indicating an initial state in which the imaging process is not performed, and
said determination unit determines, when immediately preceding control information matches the control information stored in said storage unit, that the succeeding control information contains the leading control information,
and
determines, when control information contained in the received packet does not match the control information stored in said storage unit, that the control information contained in the packet is the succeeding control information.

4. The system according to claim 1, wherein said receiving unit further comprises a measuring unit configured to measure a time elapsed from reception of the leading control information, and
said decision unit decides, as the leading control timing, a timing at which a reference time elapses upon reception of the leading control information.

5. The system according to claim 1, wherein said transmission unit generates the packet containing, as a pair with the control information, time information indicating a time when the control information is input from said control unit, and
said decision unit decides the succeeding control timing such that a time difference between the leading control timing and the succeeding control timing is equal to a time difference between time information as a pair with the leading control information and time information as a pair with the succeeding control information.

6. The system according to claim 1, wherein the control information includes control information for controlling exposure by said imaging unit and control information for controlling light emission by said imaging unit.

7. The system according to claim 1, wherein said decision unit further comprises a presentation unit configured to present an error when a timing at which the succeeding control information is input from said determination unit delays relative to the succeeding control timing.

8. A method of controlling a wireless imaging system including
a control unit configured to output a plurality of pieces of control information for controlling an imaging process,
a transmission unit configured to wirelessly transmit a packet containing the control information,
a receiving unit configured to receive the packet and output the control information contained in the packet, and
an imaging unit configured to perform an imaging process based on the control information output from the receiving unit, the method comprising:
a determination step of determining whether the received control information is leading control information for controlling the imaging process or succeeding control information succeeding the leading control information;
a decision step of deciding a succeeding control timing at which the succeeding control information is output, with reference to a leading control timing at which the leading control information is output, and
an output step of outputting the leading control information to the imaging unit in accordance with the leading control timing and outputting the succeeding control information to the imaging unit in accordance with the succeeding control timing.

9. A wireless communication apparatus which receives a packet containing control information for controlling an imaging process by an imaging unit via wireless communication and outputs the control information contained in the packet, the apparatus comprising:
a determination unit configured to determine whether the received control information is leading control information for controlling the imaging process or succeeding control information succeeding the leading control information;
a decision unit configured to decide a succeeding control timing at which the succeeding control information is output, with reference to a leading control timing at which the leading control information is output; and
an output unit configured to output the leading control information to said imaging unit in accordance with the leading control timing and output the succeeding control information to said imaging unit in accordance with the succeeding control timing.

10. The apparatus according to claim 9, further comprising a storage unit configured to store control information indicating an initial state in which the imaging process is not performed,
wherein said determination unit determines, when immediately preceding control information matches the control information stored in said storage unit, that the succeeding control information contains the leading control information, and
determines, when control information contained in the received packet does not match the control information stored in said storage unit, that the control information contained in the packet is the succeeding control information.

11. The apparatus according to claim 9, further comprising a measuring unit configured to measure a time elapsed from reception of the leading control information,
wherein said decision unit decides, as the leading control timing, a timing at which a reference time elapses upon reception of the leading control information.

12. The apparatus according to claim 9, wherein the packet contains, as a pair, the control information and time information indicating a time when the control information is input to a transmission source of the packet, and
said decision unit decides the succeeding control timing such that a time difference between the leading control timing and the succeeding control timing is equal to a time difference between time information as a pair with the leading control information and time information as a pair with the succeeding control information.

13. A non-transitory computer-readable storage medium storing a program for causing a computer to serve as each unit of a wireless communication apparatus defined in claim 9.

* * * * *